United States Patent
Miyanagi et al.

(10) Patent No.: US 7,630,111 B2
(45) Date of Patent: Dec. 8, 2009

(54) OPTICAL SCANNING APPARATUS AND IMAGE FORMING APPARATUS

(75) Inventors: Hideto Miyanagi, Osaka (JP); Akihiro Masaki, Osaka (JP)

(73) Assignee: Kyocera Mita Corporation (JP)

( * ) Notice: Subject to any disclaimer, the term of this patent is extended or adjusted under 35 U.S.C. 154(b) by 181 days.

(21) Appl. No.: 11/879,533

(22) Filed: Jul. 18, 2007

(65) Prior Publication Data

US 2008/0018970 A1    Jan. 24, 2008

(30) Foreign Application Priority Data

Jul. 20, 2006    (JP)    ............................. 2006-197859

(51) Int. Cl.
G02B 26/08    (2006.01)
(52) U.S. Cl. .................................... 359/197.1
(58) Field of Classification Search ................ 359/197, 359/216.1, 819, 820; 250/234–236
See application file for complete search history.

(56) References Cited

U.S. PATENT DOCUMENTS

2003/0234856 A1 * 12/2003 Jin ............................ 347/238

2005/0213176 A1    9/2005 Shiraishi

FOREIGN PATENT DOCUMENTS

| CN | 1677159 | 10/2005 |
|---|---|---|
| JP | 2006-91346 | 4/2006 |

\* cited by examiner

*Primary Examiner*—Euncha P Cherry
(74) *Attorney, Agent, or Firm*—Gerald E. Hespos; Anthony J. Casella (57) ABSTRACT

An optical scanning apparatus includes a light source which emits optical beam; a light deflector which deflects the optical beam from the light source in a main scanning direction; an optical system which leads the optical beam from the light deflector to a scanned surface; and an optical sensor equipped with a light-receiving part to receive the optical beam from the light deflector excluding a part of the optical beam which falls in an effective exposure area of the scanned surface and used to control scan timing; and a holding member which holds the optical sensor with the light-receiving part tilted at a predetermined angle with respect to the main scanning direction.

9 Claims, 8 Drawing Sheets

OPTICAL SCANNING APPARATUS AND IMAGE FORMING APPARATUS

BACKGROUND OF THE INVENTION

1. Field of the Invention

The present invention relates to an optical scanning apparatus mounted on an image forming apparatus such as a copier, printer, and facsimile machine for exposure-scanning surfaces of image bearing members with optical beams (e.g., laser beams).

2. Description of the Related Art

Optical scanning apparatuses used in copiers, printers, and the like generally expose a surface of an image bearing member typified by a photosensitive drum, i.e., a scanned surface, while scanning it, and thereby form a predetermined electrostatic image on the surface of the photosensitive drum. In optical scanning apparatus, an optical beam, such as a laser beam, emitted from a light source is deflected in a main scanning direction by a light deflector and directed at the scanned surface by an optical system.

Recently, image forming apparatus capable of forming color images have spread widely. They include so-called tandem image forming apparatus which are equipped with photosensitive drums for multiple colors. The tandem image forming apparatus generally have four photosensitive drums corresponding to four colors of yellow, magenta, cyan, and black lined up in order along a sheet transport direction or along a travel (rotation) direction of intermediate transfer bodies. On the tandem image forming apparatus, laser beams emitted from an optical scanning apparatus form electrostatic images corresponding to the four colors on respective photosensitive drums, the electrostatic images are developed to toner images of the respective colors, and the toner images are superimposedly transferred to a transfer sheet to form a color image.

An example of an optical scanning apparatus mounted on such a tandem image forming apparatus is found in Japanese Patent Laid-Open No. 2006-91346 (D1). The optical scanning apparatus (optical beam scanning apparatus) described in Document D1 has light sources corresponding to four colors of yellow, magenta, cyan, and black. The laser beams emitted from the light sources enter a polygon mirror, which is a light deflector, at different angles from each other. The polygon mirror reflects the laser beams off its reflecting surfaces and thereby deflects them in the main scanning direction. The deflected laser beams are further deflected parallel to the axis direction of the photosensitive drums at uniform velocity by an fθ lens and directed at the surfaces of the photosensitive drums via reflecting mirrors to form an image.

The optical scanning apparatus (optical beam scanning apparatus) mounted on a tandem image forming apparatus such as the one disclosed in Document D1 is equipped with an optical sensor to receive the laser beams reflected by the polygon mirror excluding that part of the optical beams which falls in an effective exposure area of the scanned surface and is used to control scan timing for the laser beams corresponding to the four colors. According to D1, to enable accurate detection, the laser beam with the smallest scanning curvature (curvilinear distortion of scan lines) is used out of the laser beams passing through the fθ lens.

However, depending on the optical scanning apparatus, the laser beams reflected by the polygon mirror are sometimes configured to enter the optical sensor directly without passing through the fθ lens, by force of the structure of an inner optical path. In that case, it may not be possible to avoid adverse effects on scanning which are caused by incident angles of laser beams on the polygon mirror, face tangle error of the polygon mirror, and the like and which should essentially be corrected by the fθ lens. Also, when correcting scanning curvature using two or more fθ lenses for convenience of placement of the optical system, such a level of laser beams that cannot be corrected sufficiently may enter the optical sensor. In these cases, the laser beams enter the optical sensor, maintaining scanning curvature, and thus it is highly likely that a deviation will occur in the scan timing for the laser beams corresponding to multiple colors. This can cause out-of-color registration of a color image, resulting in degradation of image quality.

SUMMARY OF THE INVENTION

An object of the present invention is to provide an optical scanning apparatus which can reduce deviations in scan timing even when an optical sensor used to control scan timing receives an optical beam which has a tilt such as scanning curvature in the main scanning direction.

To achieve the above object, according to one aspect of the present invention, there is provided an optical scanning apparatus, comprising: a light source which emits an optical beam; a light deflector which deflects the optical beam from the light sources in a main scanning direction; an optical system which leads the optical beam from the light deflector to a scanned surface; an optical sensor having a light-receiving part to receive the optical beam from the light deflector excluding a part of the optical beam which falls in an effective exposure area of the scanned surface and used to control scan timing; and a holding member which holds the optical sensor with the light-receiving part tilted at a predetermined angle with respect to the main scanning direction.

According to another aspect of the present invention, there is provided an image forming apparatus, comprising: an image bearing member which bears toner image corresponding to an electrostatic image; and an optical scanning apparatus which forms the electrostatic images by emitting a beam to surfaces of the image bearing member, wherein the optical scanning apparatus has the configuration described above.

DETAILED DESCRIPTION OF THE PREFERRED EMBODIMENTS

Figure 7:
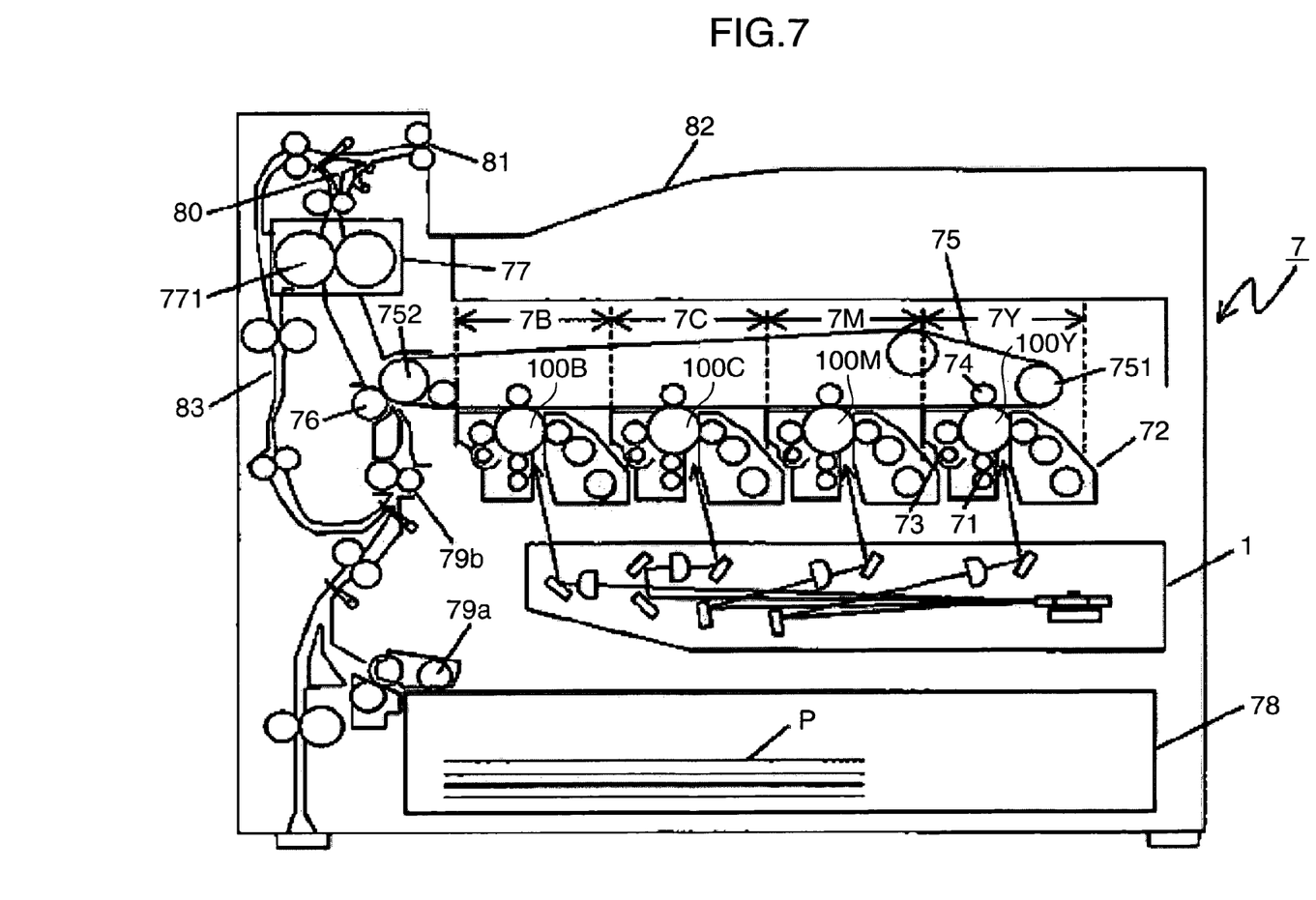
FIG. 7 is a schematic vertical sectional view of an image forming apparatus to which the optical scanning apparatus according to the present invention has been applied.

An embodiment of the present invention will be described with reference to the drawings. FIG. 7 is a schematic sectional view of a printer 7 on which an optical scanning apparatus according to the present invention is mounted. The printer 7 here is a tandem color printer. Four image forming units 7Y, 7M, 7C, and 7B are disposed in order from the upstream side (right side in FIG. 7) along a transport direction of transfer sheet, in a body of the color printer 7. The image forming units 7Y, 7M, 7C, and 7B respectively form yellow, magenta, cyan, and black images in sequence through charging, exposure, development, and transfer processes.

The image forming units 7Y, 7M, 7C, and 7B have respective photosensitive drums 100Y, 100M, 100C, and 100B which bear visible images (toner images) of respective colors. The toner images formed on the photosensitive drums are rotated clockwise in FIG. 7 by a drive mechanism (not shown) and transferred in sequence to an intermediate transfer belt 75 which travels adjacent to the image forming units. The toner images are transferred once to transfer sheet P by a transfer roller 76 and fixed to the transfer sheet P by a fixing unit 77. Subsequently, the transfer sheet P is ejected from the apparatus body. An image forming process is performed with respect to the photosensitive drums 100Y, 100M, 100C, and 100B while the photosensitive drums are rotated counterclockwise in FIG. 7.

The transfer sheet P to which the toner images are transferred is housed in a paper cassette 78 at the lower part of the apparatus and transported to the transfer roller 76 via a feed roller 79a and resist roller 79b. A dielectric resin sheet is used for the intermediate transfer belt 75, which can be an endless belt with both ends joined by being superposed on each other or a seamless belt with no seam.

Next, the image forming unit 7Y will be described by representing the image forming units 7Y, 7M, 7C, and 7B. Around and below the photosensitive drum 100Y installed rotatably, there are an electrostatic charger 71 which electrostatically charges the photosensitive drum 100Y, an optical scanning apparatus 1 which exposes the photosensitive drum 100Y according to image information, a developing unit 72 which forms toner images on the photosensitive drum 100Y, and cleaning unit 73 which removes residual toner from the photosensitive drum 100Y. This is also the case with the other image forming units 7M, 7C, and 7B. Incidentally, the optical scanning apparatus 1 will be described later with reference to FIGS. 1 to 6.

When the user gives an image formation start command, the surface of the photosensitive drum 100Y is charged uniformly by the electrostatic charger 71. Next, the photosensitive drum 100Y is irradiated with a laser beam by the optical scanning apparatus 1 and an electrostatic image is formed on the surface of the photosensitive drum 100Y according to an image signal. The developing unit 72 is filled with a predetermined amount of yellow toner particles by a replenishment system (not shown). Toner particles are supplied to the photosensitive drum 100Y by the developing unit 72 and electrostatically adheres to the photosensitive drum 10Y, thereby forming a yellow toner image according to the electrostatic image formed by exposure from the optical scanning apparatus 1. This is also the case with the other photosensitive drums 100M, 100C, and 100B, and magenta, cyan, and black toner images are formed, respectively.

After an electrical field is applied to the intermediate transfer belt 75 at a predetermined transfer voltage, the yellow toner image is transferred from the photosensitive drum 100Y to the intermediate transfer belt 75 by an intermediate transfer roller 74. This is also the case with the other photosensitive drums 100M, 100C, and 100B, and eventually the toner images of yellow, magenta, cyan, and black are transferred one on top of another to the intermediate transfer belt 75. The four color images are placed in relation to one another in a predetermined manner to form a predetermined full-color image. Subsequently, any residual toner particles are removed from the photosensitive drum 100Y by the cleaning unit 73 in preparation for the next electrostatic image formation.

The intermediate transfer belt 75 is looped over an upstream drive roller 751 and downstream drive roller 752. As the intermediate transfer belt 75 starts to rotate clockwise along with rotation of the drive roller 752 caused by a drive motor (not shown), the transfer sheet P is transported, with a predetermined timing, from the resist roller 79b to the transfer roller 76 installed adjacent to the intermediate transfer belt 75 and the full-color image is transferred to the transfer sheet P. The transfer sheet P to which the toner images have been transferred is transported to the fixing unit 77.

The transfer sheet P transported to the fixing unit 77 is heated and pressed by a fixing roller pair 771, and consequently the toner images are fixed on the surface of the transfer sheet P to form a predetermined full-color image. The transfer sheet P with the full-color image formed is directed in an appropriate transport direction by a branching unit 80 branched off in multiple directions. When an image is formed only on one side of the transfer sheet P, the transfer sheet P is ejected to a sheet output tray 82 by a sheet output roller 81.

On the other hand, when images are to be formed on both sides of the transfer sheet P, after passing through the fixing unit 77, the transfer sheet P is directed to a sheet transport path 83 by the branching unit 80 and transported again to the transfer roller 76 with its image surface reversed. Then, the next image formed on the intermediate transfer belt 75 is transferred to the blank side of the transfer sheet P by the transfer roller 76, the toner images are fixed by the fixing unit 77, and the transfer sheet P is ejected to the sheet output tray 82.

Figure 1:
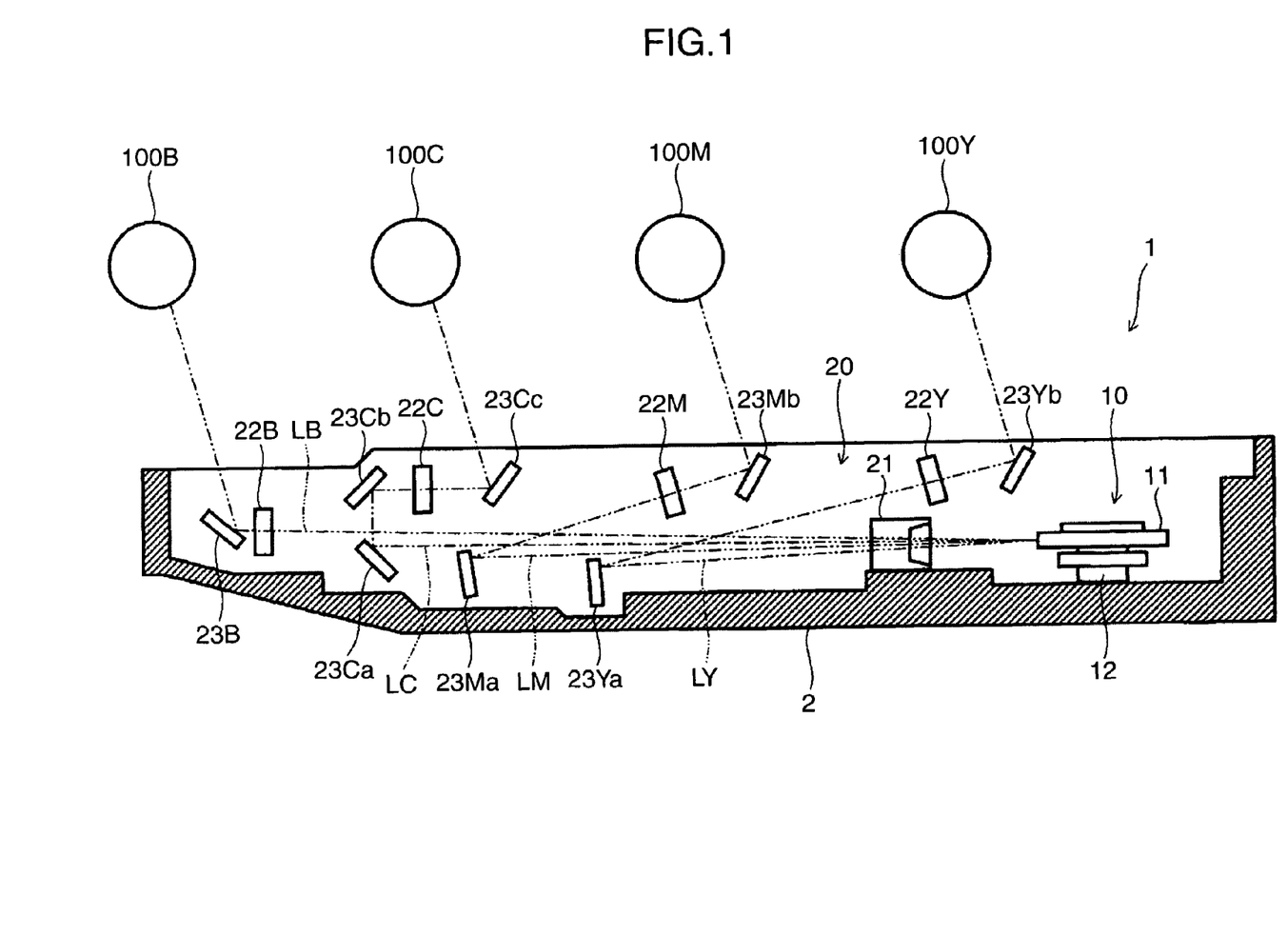
FIG. 1 is a schematic vertical sectional view of an optical scanning apparatus according to this embodiment.
Figure 2:
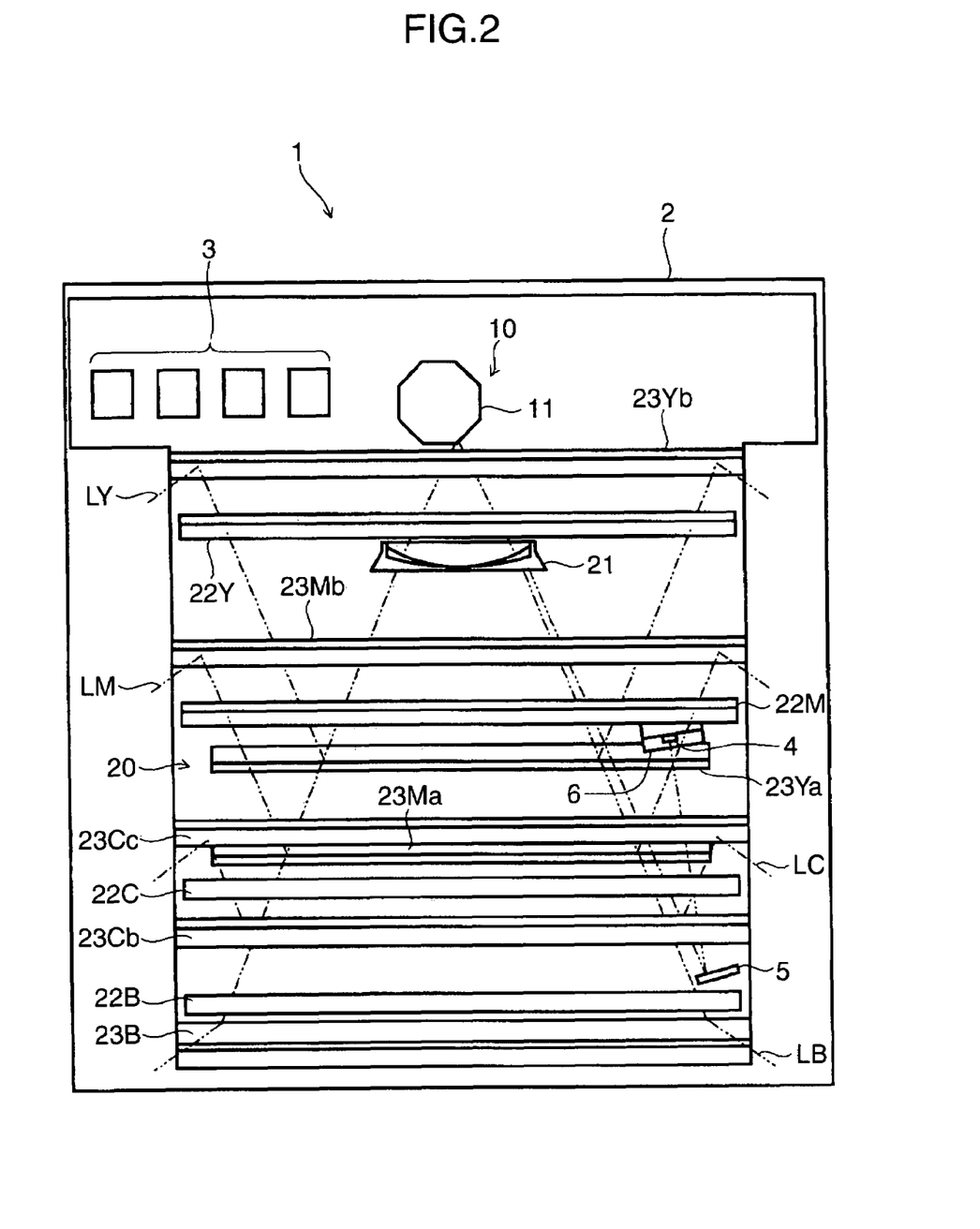
FIG. 2 is a schematic top view of the optical scanning apparatus shown in FIG. 1.

Next, detailed configuration of the optical scanning apparatus 1 will be described with reference to FIGS. 1 to 6. First, construction of the optical scanning apparatus 1 will be described briefly with reference to FIGS. 1 and 2. FIG. 1 is a schematic vertical sectional view of the optical scanning apparatus 1. FIG. 2 is a schematic top view of the optical scanning apparatus 1. As described above, the optical scanning apparatus 1 is designed to be mounted on the tandem printer 7 (image forming apparatus) equipped with four photosensitive drums 100Y, 100M, 100C, and 100B corresponding to four colors of yellow, magenta, cyan, and black.

The optical scanning apparatus 1 has light sources 3, a light deflector 10, an optical system 20, and an optical sensor 4 in a housing 2.

The light sources 3 are installed at one end in the housing 2 as shown in FIG. 2. The optical scanning apparatus 1 supports four colors of yellow, magenta, cyan, and black, and thus it has four separate light sources 3. Each light source 3 consists of a laser diode which emits an optical beam in a visible region—for example, a laser beam on a wavelength of about 670 nm.

The light deflector 10 is installed near the light sources 3. The light deflector 10 consists of a polygon mirror 11 and motor 12. The motor 12 rotationally drives the polygon mirror 11, which has a planar regular polygonal shape, around a vertical axis line in FIG. 1. Reflecting surfaces which reflect light are provided on the circumference of the polygon mirror 11 which rotates around the axis line.

Laser beams LY, LM, LC, and LB emitted from the four light sources 3 enter the reflecting surfaces around the polygon mirror 11, being offset from each other by a very small angle in a sub scanning direction (up/down direction in FIG.

1). While rotating, the polygon mirror 11 reflects the laser beams by its reflecting surfaces, deflects them in the main scanning direction (left/right direction in FIG. 2), and leads them to the other end in the housing 2.

The optical system 20 is installed in a destination area of the laser beams reflected by the light deflector 10, within the housing 2. The optical system 20 is equipped with a first fθ lens 21, second fθ lenses 22, and reflecting mirrors 23.

The first fθ lens 21 is placed just ahead of the light deflector 10 which reflects the laser beams LY, LM, LC, and LB. The first fθ lens 21 is common to the laser beams LY, LM, LC, and LB. It deflects the laser beams LY, LM, LC, and LB at uniform velocity in the main scanning direction. Also, the first fθ lens 21 slightly expands the angles of the laser beams LY, LM, LC, and LB in the sub scanning direction while correcting adverse effects on scanning, such as incident angles of the laser beams LY, LM, LC, and LB on the polygon mirror 11 and face tangle error of the polygon mirror 11, to some extent.

The yellow laser beam LY passing through the first fθ lens 21 is reflected by a reflecting mirror 23Ya near an inner bottom surface of the housing 2 and turned back to the direction of the first fθ lens 21. Subsequently, the laser beam LY passes through a second fθ lens 22Y, reflected by a reflecting mirror 23Yb near the upper end of the housing 2, reaches a surface of the yellow photosensitive drum 100Y which is a scanned surface, and forms an image there. The second fθ lens 22Y also has a capability to correct the adverse effects on scanning. According to this embodiment, the scanning curvature is corrected by collaboration of the first fθ lens 21 and second fθ lenses 22Y (and 22C and 22M).

As in the case of the yellow laser beam LY, the magenta laser beam LM passing through the first fθ lens 21 is reflected by a reflecting mirror 23Ma near the inner bottom surface of the housing 2 and turned back to the direction of the first fθ lens 21. Subsequently, the laser beam LM passes through a second fθ lens 22M, reflected by a reflecting mirror 23Mb near the upper end of the housing 2, reaches a surface of the magenta photosensitive drum 100M which is a scanned surface, and forms an image there.

The cyan laser beam LC passing through the first fθ lens 21 is reflected approximately vertically by a reflecting mirror 23Ca near the inner bottom surface of the housing 2, reflected approximately horizontally by a reflecting mirror 23Cb near the upper end of the housing 2, and thereby turned back to the direction of the first fθ lens 21. Subsequently, the laser beam LC passes through a second fθ lens 22C, reflected by a reflecting mirror 23Cc, reaches a surface of the cyan photosensitive drum 100C which is a scanned surface, and forms an image there.

The black laser beam LB passing through the first fθ lens 21 passes through a second fθ lens 22B directly without an intervening reflecting mirror. Subsequently, the laser beam LB reflected by a reflecting mirror 23B, reaches a surface of the black photosensitive drum 100B which is a scanned surface, and forms an image there.

As shown in FIG. 2, the optical sensor 4 is located near the reflecting mirror 23Ya and second fθ lens 22M, in an outward position in the main scanning direction. The optical sensor 4 receives the laser beams reflected by the polygon mirror 11 of the light deflector 10 excluding that part of the optical beams which falls in an effective exposure area of the scanned surface. Specifically, of the laser beams passing through the first fθ lens 21, the part which is reflected by a reflecting mirror 5 installed near the second fθ lens 22B enters the optical sensor 4. That is, the optical sensor 4 is configured to receive the laser beams which have just passed through the first fθ lens 21 and are yet to be corrected adequately for scanning curvature.

The optical sensor 4 is a synchronization detector used to control the scan timing for the laser beams LY, LM, LC, and LB corresponding to the four colors. The optical sensor 4 may be any of various types including, for example, a photodiode, phototransistor, and photo IC. Especially, a BD (beam detector) provided with a two-dimensional light-receiving surface having a few millimeters in size can be used suitably.

Figure 3:
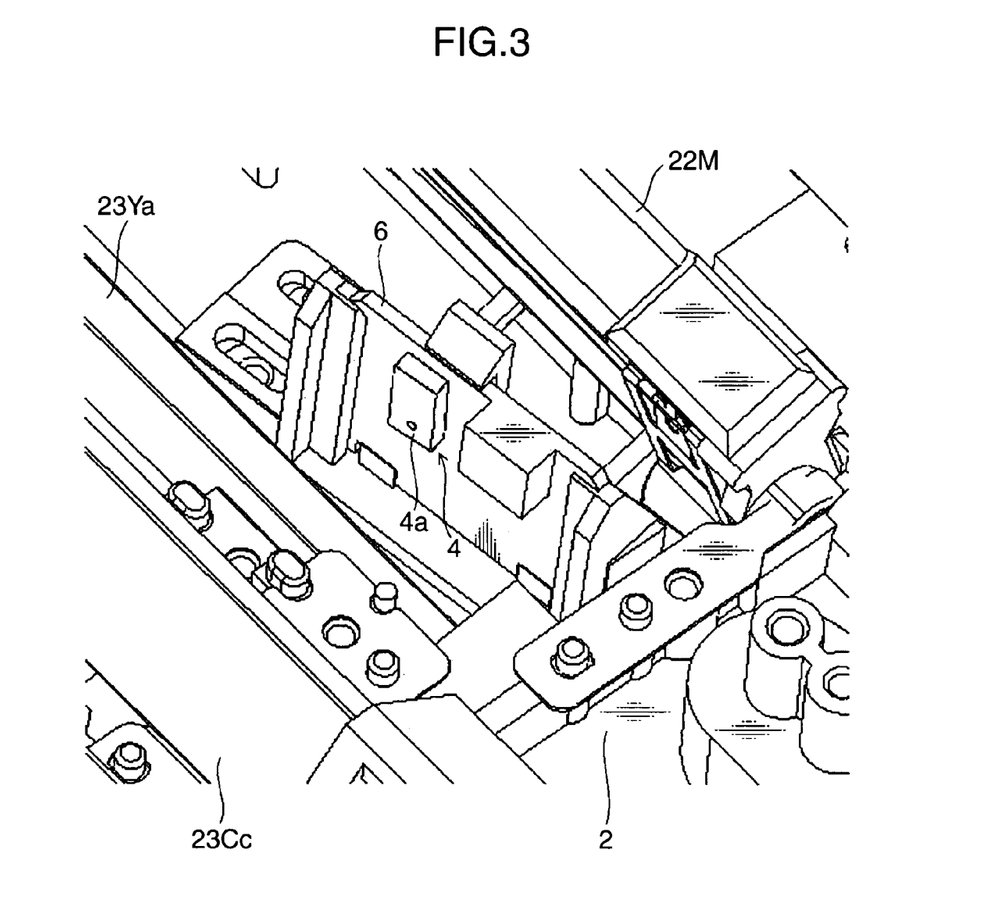
FIG. 3 is a perspective view of an optical sensor shown in FIG. 2 and its surroundings as viewed from above.

Next, a mounting configuration of the optical sensor 4 will be described in detail with reference to FIGS. 3 to 5 in addition to FIG. 2. FIG. 3 is a perspective view of the optical sensor and its surroundings as viewed from above, FIG. 4 is a perspective view of the optical sensor as viewed from the front, and FIG. 5 is a partially enlarged front view of the optical sensor.

As described above, the optical sensor 4 is placed near the reflecting mirror 23Ya and second fθ lens 22M shown in FIG. 2 and FIG. 3, being mounted on a base member 6 (holding member). The base member 6 holds the optical sensor 4 against the traveling direction of the laser beams so that the laser beams reflected by the reflecting mirror 5 (see FIG. 2) will be incident perpendicularly on a light-receiving part 4a of the optical sensor 4.

Figure 4:
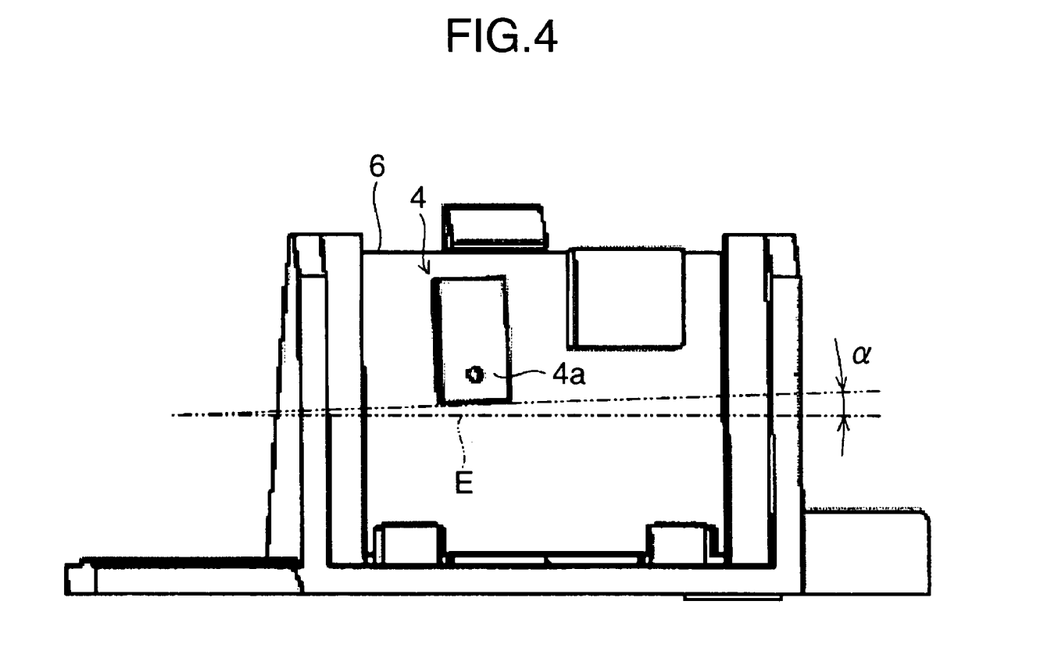
FIG. 4 is a perspective view of the optical sensor shown in FIG. 3 as viewed from the front.
Figure 5:
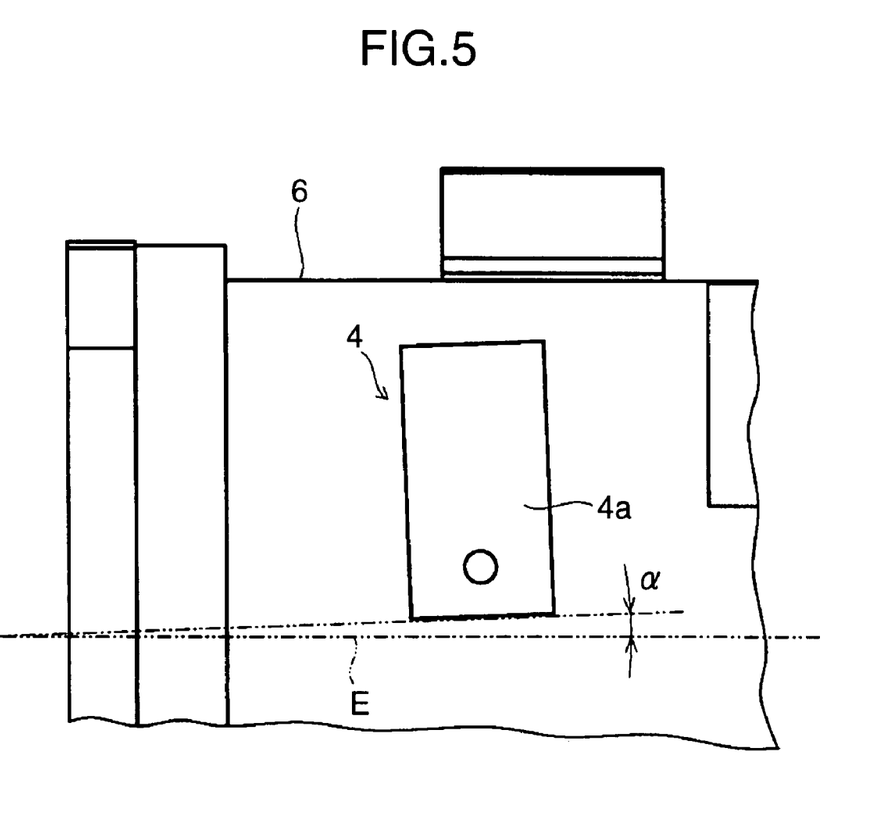
FIG. 5 is a partially enlarged front view of the optical sensor shown in FIG. 3.

As shown in FIG. 4 and FIG. 5, the optical sensor 4 is held with its light-receiving part 4a tilted at a predetermined angle α with respect to the main scanning direction (a two-dot chain line E in FIG. 4 and FIG. 5). The tilt angle α is set at 0.8° to match the scanning curvature of the laser beams reflected by the polygon mirror 11 of the light deflector 10. The scanning curvature is caused by the incident angles of laser beams on the polygon mirror 11, face tangle error of the polygon mirror 11, and the like.

Figure 6:
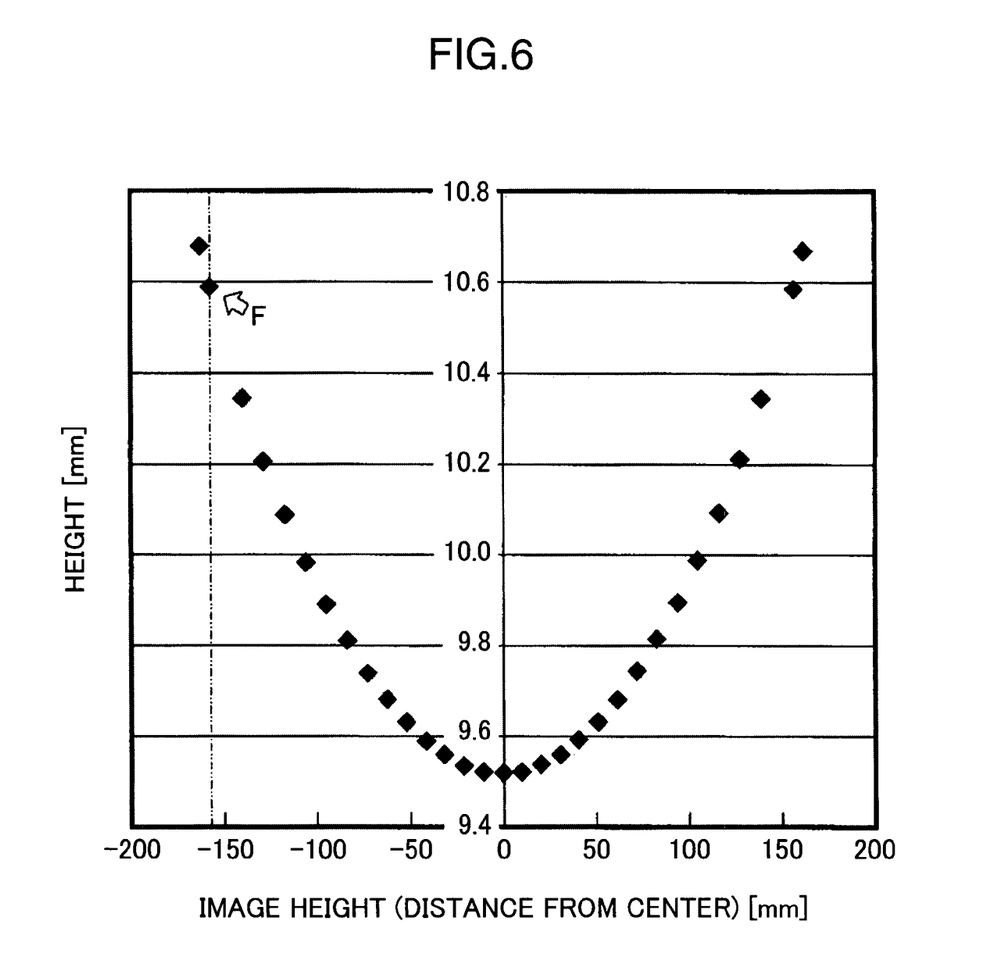
FIG. 6 is a graph showing a trajectory of a laser beam in a main scanning direction, where the laser beam has scanning curvature.

Next, the tilt angle α of the light-receiving part 4a of the optical sensor 4 will be described with reference to FIG. 6. FIG. 6 is a graph showing a trajectory of a laser beam in the main scanning direction, where the laser beam has scanning curvature. In the graph shown in FIG. 6, the abscissa represents image height (distance from the center in the main scanning direction) and the ordinate represents height in the vertical direction from a reference position of the laser beam.

As shown in FIG. 6, the laser beam with scanning curvature curves upward as it goes outward (both ends along the main scanning direction where the image height increases) from the center in the main scanning direction (where the image height is 0 mm). The optical sensor 4 is located where the image height is minus 157 mm (arrow F) in FIG. 6. Thus, in FIG. 6, using the angle of the laser beam with respect to the main scanning direction from the reference position, the tilt angle α is calculated to be 0.8°.

Figure 8:
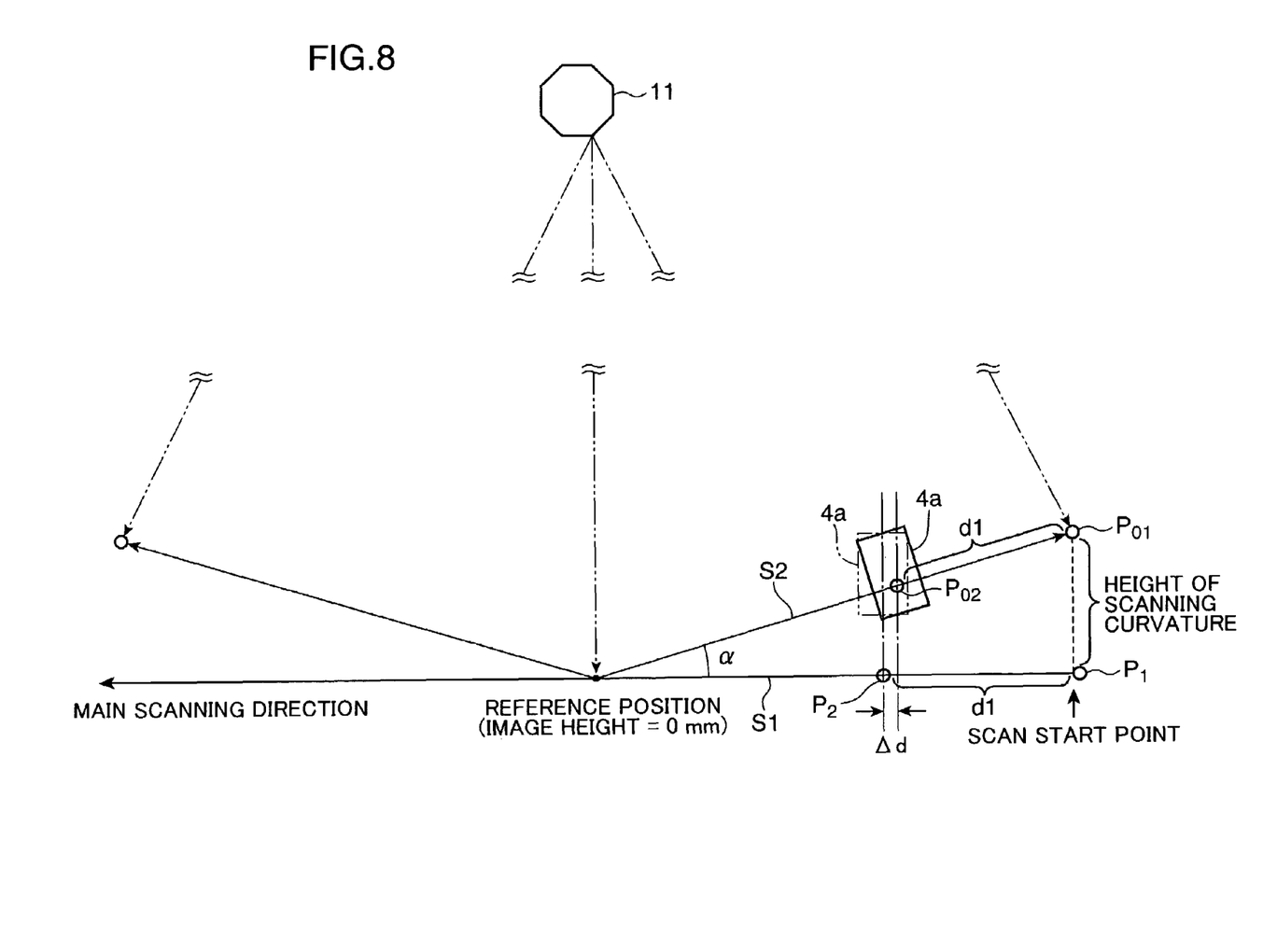
FIG. 8 is a schematic diagram illustrating the effect of installing an optical sensor according to a tilt angle α.

FIG. 8 is a schematic diagram illustrating the effect of installing the optical sensor 4 according to the tilt angle α. A laser beam without any scanning curvature travels at a constant height position during scanning in the main scanning direction (scanning trajectory denoted by symbol S1). On the other hand, as described in FIG. 6, a laser beam with scanning curvature advances in the main scanning direction by changing its height position (scanning trajectory denoted by symbol S2, which actually is a curved trajectory).

The optical sensor 4 is placed at a predetermined position on a scanning trajectory. When controlling scan timing at a scan point $P_2$ a predetermined scanning distance d1 away from a scan start point $P_1$ on the scanning trajectory S1, the light-receiving part 4a of the optical sensor 4 is placed according to the scan point $P_2$ as indicated by a chain double-dashed line in the figure. However, if the light-receiving part 4a is placed at the scan point $P_2$ in spite of scanning curvature, it becomes impossible to detect the scan timing accurately.

That is, the position of a scan point $P_{02}$ a predetermined scanning distance d1 away from a scan start point $P_{01}$ on the scanning trajectory S2 is displaced by Δd in the main scanning direction. Thus, if the light-receiving part 4a is placed at a point corresponding to the scan point $P_2$, the scan timing is detected with an error of Δd. However, if the light-receiving part 4a is placed at a point corresponding to the scan point $P_{02}$ by being tilted by the tilt angle α with respect to the main scanning direction of the laser beam and being brought closer to the scan start point $P_{01}$, it is possible to prevent the error in the detection of the scan timing.

As described above, the optical scanning apparatus 1 according to this embodiment is equipped with the light sources 3 which emit laser beams which are optical beams, the light deflector 10 which deflects the laser beams from the light sources 3 in the main scanning direction, the optical system 20 which leads the laser beams from the light deflector 10 to a scanned surface, the optical sensor 4 which receives the laser beams from the light deflector 10 excluding that part of the laser beams which falls in an effective exposure area of the scanned surface and controls scan timing. In this configuration, the optical sensor 4 is held with its light-receiving part 4a tilted at a predetermined angle with respect to the main scanning direction of the laser beams.

Consequently, when receiving a laser beam which follows a trajectory tilted in the height direction from the main scanning direction due to scanning curvature, the optical sensor 4 can receive the laser beam at an angle which compensates for the tilt. This makes it possible to reduce degradation in detection accuracy of the optical sensor 4 caused by the tilt of the laser beam. This allows the optical scanning apparatus 1 to prevent error in the detection of scan timing and obtain high quality images without out-of-color registration.

Also, the optical sensor 4 is held with its light-receiving part 4a tilted to suit the angle α of the scanning curvature of the laser beams coming from the light deflector 10. This makes it possible to reliably bring the light-receiving angle of the optical sensor 4 into coincidence with the angle α of the scanning curvature caused by the incident angles of the laser beams on the light deflector 10, face tangle error of the light deflector 10, and the like. Consequently, the detection accuracy of the optical sensor 4 is improved further. This allows the optical scanning apparatus 1 to control scan timing suitably and further improve image quality.

An embodiment of the present invention has been described above, but the scope of the present invention is not limited to this and various modifications can be made without departing from the spirit and scope of the present invention.

For example, in the above embodiment, the light-receiving part 4a of the optical sensor 4 is tilted at an angle α assuming that the scanning curvature (curvilinear distortion of scan lines) of the laser beams is 0.8°. The tilt angle α is not limited to 0.8°, and may be set to another value depending on the incident angles of laser beams on the polygon mirror 11, face tangle error of the polygon mirror 11, and the like.

The present invention can be used for optical scanning apparatus which are equipped with an optical sensor to receive optical beams and control scan timing.

The concrete embodiment described above mainly includes the following configurations.

According to one aspect of the present invention, there is provided an optical scanning apparatus, comprising: a light source which emits an optical beam; a light deflector which deflects the optical beam from the light sources in a main scanning direction; an optical system which leads the optical beam from the light deflector to a scanned surface; an optical sensor having a light-receiving part to receive the optical beam from the light deflector excluding a part of the optical beam which falls in an effective exposure area of the scanned surface and used to control scan timing; and a holding member which holds the optical sensor with the light-receiving part tilted at a predetermined angle with respect to the main scanning direction.

According to another aspect of the present invention, there is provided an image forming apparatus, comprising: an image bearing member which bears a toner image corresponding to electrostatic image; and an optical scanning apparatus which forms the electrostatic images by emitting beam to surfaces of the image bearing member, wherein the optical scanning apparatus has the configuration described above.

With the above configurations, when receiving a laser beam which follows a trajectory tilted in the height direction from the main scanning direction due to scanning curvature, the optical sensor can receive the laser beam at an angle which compensates for the tilt. This makes it possible to reduce degradation in detection accuracy of the optical sensor caused by the tilt of the optical beam. This allows the optical scanning apparatus to prevent error in the detection of scan timing and obtain high quality images without out-of-color registration.

In the above configurations, preferably the holding member holds the optical sensor with the light-receiving part tilted to suit the angle of the scanning curvature of the optical beam from the light deflector.

This configuration makes it possible to reliably bring the light-receiving angle of the optical sensor into coincidence with the angle of the scanning curvature caused by the incident angles of the optical beams on the light deflector, face tangle error of the light deflector, and the like. This makes it possible to further improve the detection accuracy of the optical beam. This allows the optical scanning apparatus to control scan timing suitably and further improve image quality.

According to another aspect of the present invention, there is provided an optical scanning apparatus, comprising: a light source which emits an optical beam; a light deflector which deflects the optical beam from the light sources in a main scanning direction; an optical system which leads the optical beam from the light deflector to a scanned surface; an optical sensor having a light-receiving part to receive the optical beam from the light deflector excluding a part of the optical beam which falls in an effective exposure area of the scanned surface and used to control scan timing; and a holding member which holds the optical sensor, wherein the optical beam have scanning curvature, and the optical sensor is held by the holding member in such a way that the light-receiving part comes into a position a predetermined distance away from a scan start position on a scanning trajectory followed by the optical beam.

This configuration also allows the optical scanning apparatus to obtain high quality image without out-of-color registration.

This application is based on patent application No. 2006-197859 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An optical scanning apparatus, comprising:
a light source which emits an optical beam;
a light deflector which deflects the optical beam from the light sources in a main scanning direction;
an optical system which leads the optical beam from the light deflector to a scanned surface;
an optical sensor having a light-receiving part to receive the optical beam from the light deflector excluding a part of the optical beam which falls in an effective exposure area of the scanned surface and used to control scan timing; and
a holding member which holds the optical sensor with the light-receiving part tilted with respect to the main scanning direction of the optical beam at an angle of a scanning curvature of the optical beam from the light deflector.

2. The optical scanning apparatus according to claim 1, wherein the light deflector is rotatable about an axis, the main scanning direction being substantially perpendicular to the rotational axis of the light deflector.

3. The optical scanning apparatus according to claim 2, wherein the light-receiving part is tilted with respect to the rotational axis of the light deflector.

4. The optical scanning apparatus according to claim 3, wherein the light-receiving part is tilted with respect to the main scanning direction at an angle of approximately 0.8°.

5. An image forming apparatus, comprising:
an image bearing member which bears a toner image corresponding to an electrostatic image; and
an optical scanning apparatus which forms the electrostatic images by emitting a beam to surfaces of the image bearing members
wherein the optical scanning apparatus includes:
a light source which emits an optical beam;
a light deflector which deflects the optical beam from the light sources in a main scanning direction;
an optical system which leads the optical beam from the light deflector to a scanned surface;
an optical sensor having a light-receiving part to receive the optical beam from the light deflector excluding a part of the optical beam which falls in an effective exposure area of the scanned surface and used to control scan timing; and
a holding member which holds the optical sensor with the light-receiving part tilted with respect to the main scanning direction of the optical beam at an angle of a scanning curvature of the optical beam from the light deflector.

6. The image forming apparatus according to claim 5, wherein the holding member holds the optical sensor with the light-receiving part tilted to suit the angle of the scanning curvature of the optical beams from the light deflector.

7. The image forming apparatus according to claim 5, wherein the light deflector is rotatable about an axis, the main scanning direction being substantially perpendicular to the rotational axis of the light deflector.

8. The image forming apparatus according to claim 7, wherein the light-receiving part is tilted with respect to the rotational axis of the light deflector.

9. The image forming apparatus according to claim 8, wherein the light-receiving part is tilted with respect to the main scanning direction at an angle of approximately 0.8°.

* * * * *